United States Patent
Martin

(10) Patent No.: US 7,084,521 B1
(45) Date of Patent: Aug. 1, 2006

(54) METHOD AND APPARATUS FOR GENERATING HYDRO-ELECTRIC POWER

(76) Inventor: Gerald G. Martin, P.O. Box 257, Hays, MN (US) 59527

( * ) Notice: Subject to any disclaimer, the term of this patent is extended or adjusted under 35 U.S.C. 154(b) by 0 days.

(21) Appl. No.: 11/288,264

(22) Filed: Nov. 29, 2005

Related U.S. Application Data

(60) Provisional application No. 60/653,515, filed on Feb. 17, 2005.

(51) Int. Cl.
*F03B 13/00* (2006.01)

(52) U.S. Cl. .............................. 290/54; 290/53; 290/50

(58) Field of Classification Search .................. 290/54, 290/53, 50
See application file for complete search history.

(56) References Cited

U.S. PATENT DOCUMENTS

| | | | |
|---|---|---|---|
| 3,980,894 A | 9/1976 | Vary et al. | |
| 4,053,787 A | 10/1977 | Diggs | |
| 4,132,901 A * | 1/1979 | Crausbay | 290/53 |
| 4,629,904 A * | 12/1986 | Rojo et al. | 290/52 |
| 4,674,279 A | 6/1987 | Ali et al. | |
| 4,717,832 A | 1/1988 | Harris | |
| 4,782,663 A | 11/1988 | Bellamy | |
| 4,801,811 A * | 1/1989 | Assaf et al. | 290/55 |
| 5,377,485 A * | 1/1995 | Bellamy | 60/398 |
| 6,114,773 A * | 9/2000 | Kouris | 290/52 |
| 6,359,347 B1 | 3/2002 | Wolf | |
| 6,396,162 B1 * | 5/2002 | Carrillo | 290/43 |
| 6,531,788 B1 * | 3/2003 | Robson | 290/43 |
| 6,546,723 B1 | 4/2003 | Watten et al. | |
| 6,559,554 B1 * | 5/2003 | Finley et al. | 290/54 |
| 2003/0066289 A1 | 4/2003 | Watten et al. | |
| 2003/0167760 A1 | 9/2003 | Jackson | |
| 2003/0192308 A1 | 10/2003 | Hastings | |
| 2004/0066043 A1 | 4/2004 | Maiwald et al. | |

FOREIGN PATENT DOCUMENTS

| | | |
|---|---|---|
| DE | 19544141 A1 * | 11/1995 |
| DE | 19544141 | 5/1997 |
| EP | 0036453 | 9/1981 |
| JP | 64-77760 | 3/1989 |
| JP | 2003-201949 | 7/2003 |
| WO | WO 03054386 | 7/2003 |

* cited by examiner

*Primary Examiner*—Darren Schuberg
*Assistant Examiner*—Iraj A. Mohandesi
(74) *Attorney, Agent, or Firm*—Richard C. Litman

(57) ABSTRACT

A hydroelectric power generating method and/or apparatus provides one or more inlet pipes perpendicular to a flow of water in a stream or river. The inlet pipes have a length and plural apertures along the length of the at least one inlet pipe. A feedline and a turbine generator combination are interconnected with the inlet pipes. One or more outlet pipes are interconnected with the feedline and the turbine generator combination. The outlet pipes have an elevation lower than the inlet pipe. A flow of water passes through the inlet pipes, the feedline, the turbine generator combination, and the outlet pipes, and generates electricity from the flow of water passing through the turbine generator combination. The hydroelectric power generating method also provides a pressure dissipation device that causes a reduction in the pressure of the water so that the water can be released safely back into the stream or river.

17 Claims, 3 Drawing Sheets

METHOD AND APPARATUS FOR GENERATING HYDRO-ELECTRIC POWER

CROSS-REFERENCE TO RELATED APPLICATION

This application claims the benefit of U.S. Provisional Patent Application Ser. No. 60/653,515, filed Feb. 17, 2005.

BACKGROUND OF THE INVENTION

1. Field of the Invention

The present invention relates generally to electric power generation and, more particularly to a hydroelectric power generating method and apparatus.

2. Description of the Related Art

The constant increase in demand for electric power has resulted in various sources of electric power. Coal fired electric plants strip the land and make large pits. Nuclear power is economical but involves environmental and variable issues. Hydroelectric power is a renewable source but has some environmental and ecological effects. Typical hydroelectric power is generated through the use of dams that feed turbines and turns them for power generation. Building additional dams requires environmental and ecological studies, not to mention political questions. Turbines are based on volume and pressure depending on the height of the dam and reserve of water. What they lack in pressure, they have to make up in volume. For example, German patent DE 19544141, dated May, 1997 discusses a hydroelectric power generating system using an intake installation to remove part of the water from a flowing stream. However, unlike the present invention there exist no figures showing how to increase pressure from the inlet in a successive manner.

Additionally, European patent EP 0036453 discusses installation of a hydro-electric turbine within a prefabricated tank, but unlike the present invention does not illustrate apparatus that advantageously uses head pressure from streams or lakes without dams.

Similarly, Japanese patent JP 1077760 discusses an excess water discharge control device that responsive to pressure discharges excess water according to the water level in an upper dam, but, unlike the present invention, does not appear to disclose utilization of river or stream head pressure without the use of a dam.

European patent WO 03054386 discusses placement of a turbine within a flow pipe, but, unlike the present invention, does not illustrate the construction of a piping system that advantageously utilizes stream or river head pressure without the use of a dam.

Moreover, Japanese patent 2003201949 appears to discuss the usage of paddle wheel type generators placed in a river to avoid the use of a dam, however, unlike the present invention, does not illustrate the construction of a piping system that advantageously utilizes stream or river head pressure without the use of a dam.

A need exists for a hydroelectric power generating method and apparatus that utilizes distance, elevation, and head pressure of a length of a river, stream, and/or any other water channel.

SUMMARY OF THE INVENTION

The present invention is a hydroelectric power generating method and/or apparatus. The generating apparatus is configured to pass a portion of a flow of water through an input pipe and a feedline configured with funneling of the piping to increase the pressure of the water to a pressure sufficient to turn a turbine of a turbine generator combination. The turbine is interconnected with and drives a generator that outputs electrical power. The water that flows through the turbine is then returned to the stream or river from which it came.

The hydroelectric power generating apparatus can include an inlet pipe with plural apertures along the length of the inlet pipe. The inlet pipe can be configured in the form of plural inlet pipes as desired to accommodate a predetermined amount of water. The inlet pipe is preferably positioned substantially perpendicular to the direction of the flow of water. The inlet pipe is interconnected to a feedline that includes pipe couplings, a source pipe and an input pipe. The input pipe is interconnected to the pipe couplings with a funnel shaped end.

The input pipe extends for a predetermined distance and is interconnected to a turbine generator combination. Water passes through the turbine generator combination and through an outlet pipe. The water then passes through a pressure dissipation device (tank) that causes a reduction in the pressure of the water. The pressure dissipation tank relieves pressure so that the water can be released back into the stream or river without having a negative effect on the oxygen levels in the water. The water then passes through a drain pipe and is released back into the stream or river via one or more outlet pipes. As with the inlet pipe, the outlet pipe is configured with plural apertures along the length of the outlet pipe. The water being released back into the stream or river can have the same values and natural flow as the original values before entry into the generating apparatus. Alternately, the released water could be reintroduced into another generating apparatus that is in series, using more inlets to supplement the next generating apparatus.

The piping of the power generating apparatus can be located on the bed of the stream or river, or can be provided on ground or buried in ground near the side of the stream or river. If the piping is located in the bed of the stream or river, it is preferably located on a gravel foundation such that it is not substantially damaged in extreme flood events. The turbine generator combination can be configured as desired. For example, the turbine could be a shaft propeller type turbine and the generator could be configured to generate a terminal voltage of between around eleven and thirty kilovolts. The generator output could then be connected to a transformer that could step up the voltage to around two hundred and twenty kilovolts, or to a predetermined desired output voltage.

The hydroelectric power generating apparatus can be varied with, as described above, with plural inlet pipes and plural outlet pipes. The power generating apparatus can also include flow control valves, a by-pass pipe, a y-strainer, and y-strainer valves. The power generating apparatus can be interconnected with in series with other power generating apparatuses. Various aspects of maintenance of the power generating apparatus can be accomplished through the use of the flow control valves and the by-pass pipe that enable maintenance to be performed. The y-strainer is placed inline above the generator to catch debris and sediment. This can be cleaned on a scheduled maintenance program to keep the power generating apparatus running smoothly. Variations can be made regarding the materials and configurations of the various components of the generating apparatus. The piping sizes can be reduced to reach a desired pressure sufficient to turn the turbine of the turbine generation combination. The piping can be flanged on both sides and bolted together using engineering materials and torque specifications. Deliver ductwork can be buried as it reaches the shore to significantly reduce visual impacts.

A hydroelectric power generating method provides at least one inlet pipe perpendicular to a flow of water in a stream or river, the at least one inlet pipe having a length and plural apertures along the length of the at least one inlet pipe; interconnects a feedline and a turbine generator combination with the at least one inlet pipe; interconnects at least one outlet pipe with the feedline and the turbine generator combination, the at least one outlet pipe having an elevation lower than the inlet pipe; passes a flow of water through the at least one inlet pipe, the feedline, the turbine generator combination, and the at least one outlet pipe; and generates electricity from the flow of water passing through the turbine generator combination. The hydroelectric power generating method also provides a pressure dissipation device that causes a reduction in the pressure of the water so that the water can be released back into the stream or river without having a negative effect on oxygen levels in the water.

A hydroelectric power generating apparatus includes at least one inlet pipe, the at least one inlet pipe having a length and plural apertures along the length of the at least one inlet pipe; a feedline and a turbine generator combination interconnected with said at least one inlet pipe; and at least one outlet pipe interconnected with the feedline and the turbine generator combination, the at least one outlet pipe having an elevation lower than the inlet pipe. The hydroelectric power generating apparatus is configured to generate electricity from the flow of water passing through the turbine generator combination. The hydroelectric power generating apparatus also includes a pressure dissipation device configured to cause a reduction in the pressure of water so that the water can be released back into a stream or river without having a negative effect on oxygen levels in the water.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
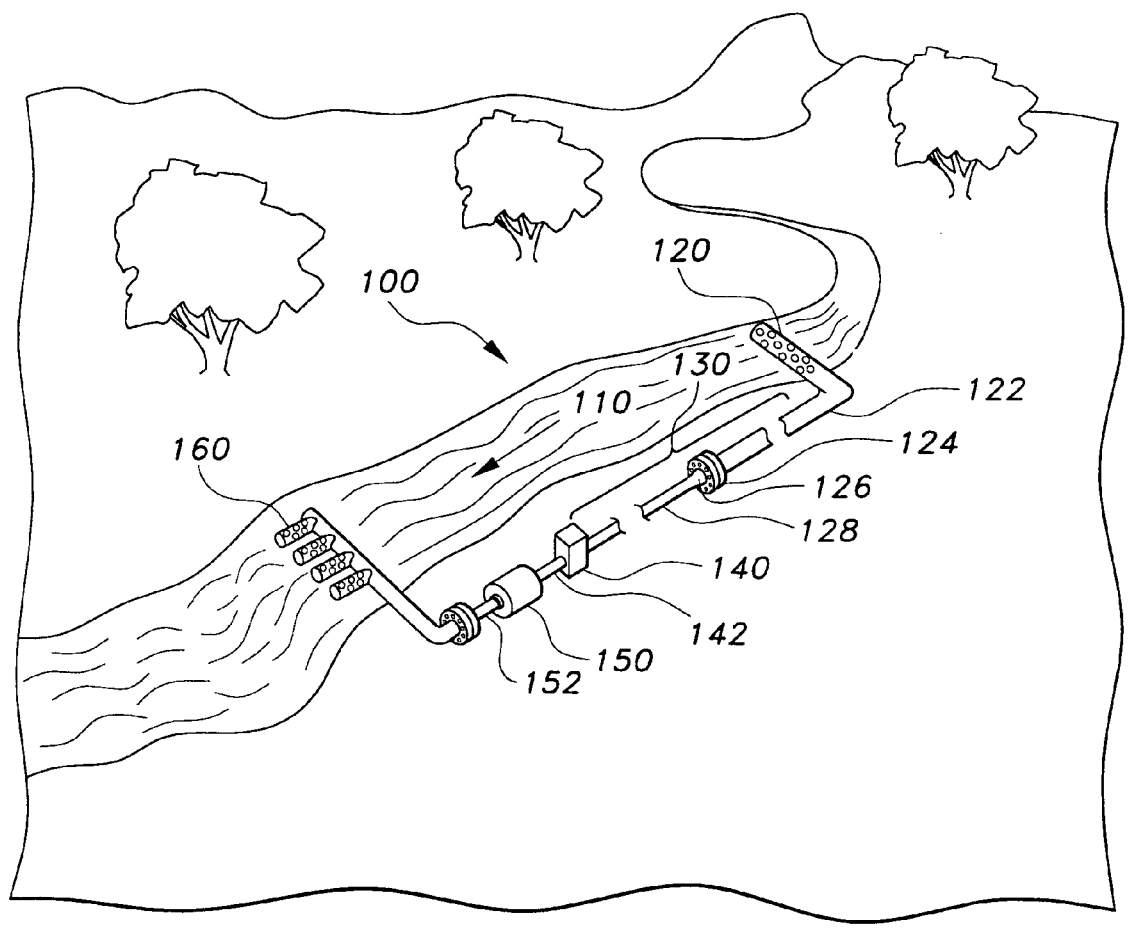
FIG. 1 is an environmental view of a hydroelectric power generating apparatus according to the present invention.

The present invention is a hydroelectric power generating method and/or apparatus. The invention disclosed herein is, of course, susceptible of embodiment in many different forms. Shown in the drawings and described herein below in detail are preferred embodiments of the invention. It is to be understood, however, that the present disclosure is an exemplification of the principles of the invention and does not limit the invention to the illustrated embodiments.

Figure 2:
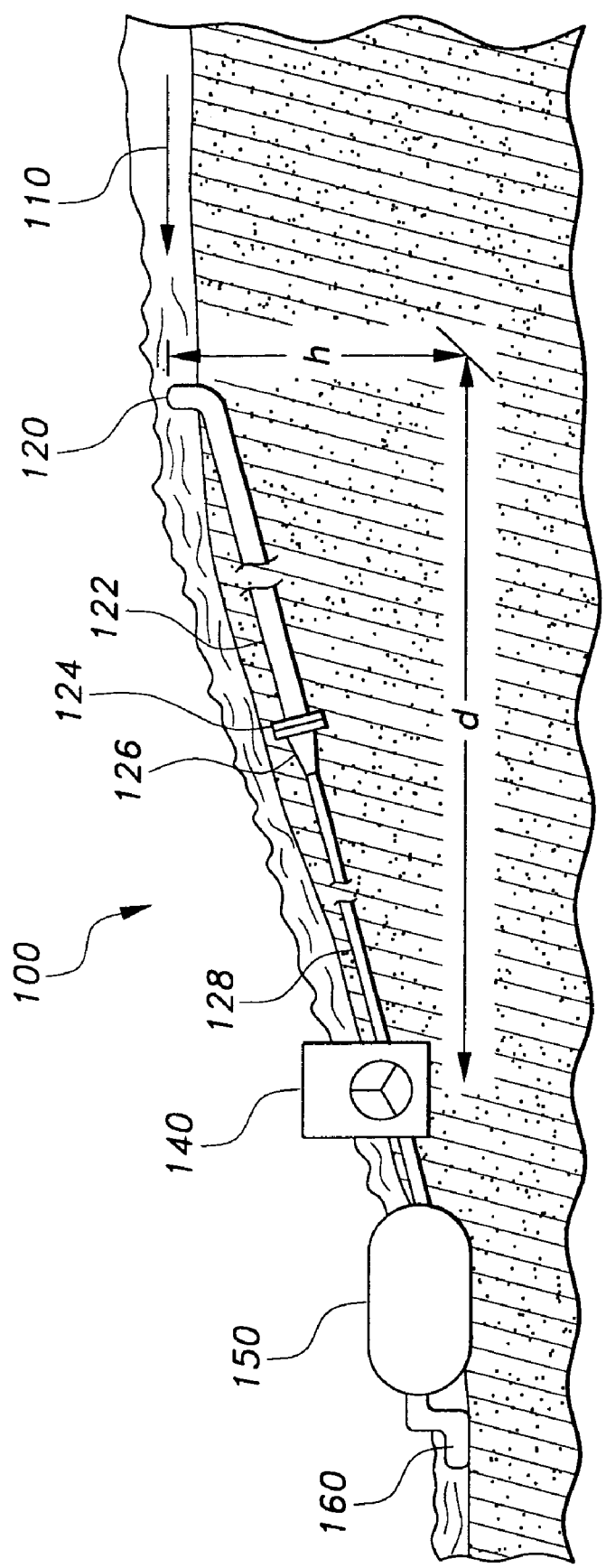
FIG. 2 is a side view of the hydroelectric power generating apparatus shown in FIG. 1.

Referring now to the drawings, FIGS. 1 and 2 show a hydroelectric power generating apparatus 100 according to the invention. The power generating apparatus 100 is configured to pass a portion of a flow of water 110 through an input pipe 120, a feedline 122 configured with funneling of the piping to increase the pressure of the water to a pressure sufficient to turn a turbine of a turbine generator combination 140. The turbine is interconnected with and drives a generator that outputs electrical power. The water that flows through the turbine is then returned to the stream or river from which it came.

As illustrated, the hydroelectric power generating apparatus 100 includes an inlet pipe 120 with plural apertures along the length of the inlet pipe 120. The inlet pipe 120 can be configured in the form of plural inlet pipes as desired to accommodate a predetermined amount of water. The inlet pipe 120 is preferably positioned substantially perpendicular to the direction of the flow of water 110. The inlet pipe is interconnected to a feedline 122 that includes pipe couplings 124, a source pipe 120 and an input pipe 128. The input pipe is interconnected to the pipe couplings 124 with a funnel shaped end 126.

The input pipe 128 extends for a predetermined distance and is interconnected to a turbine generator combination 140. Water passes through the turbine generator combination 140 and through an outlet pipe 142. The water then passes through a pressure dissipation device (tank) 150 that causes a reduction in the pressure of the water. The pressure dissipation tank 150 relieves pressure so that the water can be released back into the stream or river without having a negative effect on the oxygen levels in the water. The water then passes through a drain pipe 152 and is released back into the stream or river via one or more outlet pipes 160. As with the inlet pipe 120, the outlet pipe 160 is configured with plural apertures along the length of the outlet pipe 160. The water being released back into the stream or river can have the same values and natural flow as the original values before entry into the generating apparatus 100. Alternately, the released water could be reintroduced into another generating apparatus 100 that is in series, using more inlets to supplement the next generating apparatus 100.

The piping of the power generating apparatus 100 can be located on the bed of the stream or river, or can be provided on ground or buried in ground near the side of the stream or river. If the piping is located in the bed of the stream or river, it is preferably located on a gravel foundation such that it is not substantially damaged in extreme flood events. The turbine generator combination 140 can be configured as desired. For example, the turbine could be a shaft propeller type turbine and the generator could be configured to generate a terminal voltage of between around eleven and thirty kilovolts. The generator output could then be connected to a transformer that could step up the voltage to around two hundred and twenty kilovolts, or to a predetermined desired output voltage.

Figure 3:
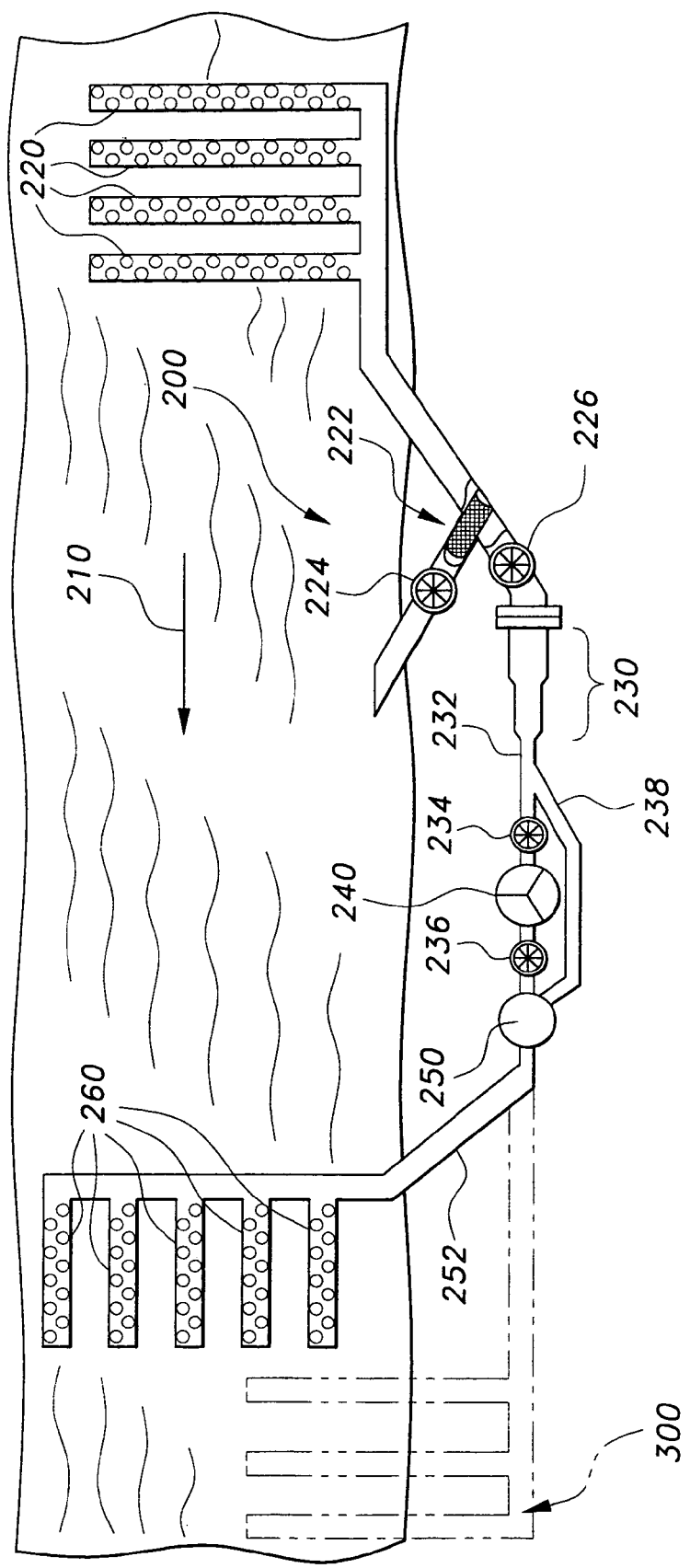
FIG. 3 is a top view of a hydroelectric power generating apparatus according to the present invention.

Referring to FIG. 3, the hydroelectric power generating apparatus 200 can be varied with, as described above, with plural inlet pipes 220 and plural outlet pipes 260. The power generating apparatus 200 shown in FIG. 3 also includes flow control valves 234 and 236, a by-pass pipe 238, a y-strainer 222, and y-strainer valves 224. This power generating apparatus 200 can be interconnected with in series with other hydroelectric power generating apparatuses 300. Various aspects of maintenance of the hydroelectric power generating apparatus 200 can be accomplished through the use of the flow control valves 234 and 236 and the by-pass pipe 238 flowing into pressure dissipation tank 250 that enable maintenance to be performed. The y-strainer 222 is placed inline above the generator to catch debris and sediment. This can be cleaned on a scheduled maintenance program to keep the power generating apparatus 200 running smoothly. Variations can be made regarding the materials and configurations of the various components of the hydroelectric power generating apparatus 200. The piping sizes can be reduced to reach a desired pressure sufficient to turn the turbine of the turbine generation combination 240. The piping can be flanged on both sides and bolted together using engineering materials and torque specifications. Delivery ductwork can be buried as it reaches the shore to significantly reduce visual impacts. The configuration of the inlets, outlets, and other components of the generating apparatus 200 can be varied as desired.

The hydroelectric power generating apparatus 200 uses volume and head pressure to turn and drive the turbine generator combination 240. The power generating apparatus 200 utilizes pipe that is reduced to reach a specific pressure and volume to obtain a predetermined pressure. While the power generating apparatus 200 is one configuration example of the hydroelectric power generating apparatus according to the present invention, it is the full intent of the applicant that a power generating apparatus according to the present invention may be varied in any number of suitable configurations as desired. For example, the piping system could be put directly in a particular water channel, material for the piping could be varied as desired to inhibit or preclude environmental damage, varying number of inlets could be provided as desired, etc.

Placement of the hydroelectric power generating apparatus 200 is preferably along the length of a stream or river where that passes through a predetermined elevation distance. For example, consider a stream or river with an elevation of approximately four hundred feet from a beginning point to an ending point along a distance of five thousand feet. A forty-eight inch diameter pipe could be used at the beginning and run for approximately two thousand feet, while the pipe is necked down to a predetermined size. With an elevation of four hundred feet, a pressure of about one hundred and seventy-five pounds per square inch could be obtained which would be sufficient pressure and volume to turn the turbine of the turbine generator combination 240.

Generating electricity using a hydroelectric power generating apparatus 200 according to the invention provides a variety of advantages over conventional power generation techniques. By using only a portion of the water flow of a stream or river, use of multiple generating apparatuses 200 placed at multiple locations along the length of a stream or river would simplify distribution and make demand more adjustable. Output from generating apparatuses could be used by big electric companies or, on a smaller level, by farmers and ranchers for irrigation, etc., using either the head pressure or the turbine generation for running motors for the pumps. Small towns and cities could use the same methods with their water systems.

A hydroelectric power generating method provides one or more inlet pipes perpendicular to a flow of water in a stream or river. The inlet pipes have a length and plural apertures along the length of the inlet pipes. A feedline and a turbine generator combination are interconnected with the inlet pipes. One or more outlet pipes are interconnected with the feedline and the turbine generator combination. The outlet pipes have an elevation lower than the inlet pipe. A flow of water passes through the inlet pipes, the feedline, the turbine generator combination, and the outlet pipes, and generates electricity from the flow of water passing through the turbine generator combination. The hydroelectric power generating method also provides a pressure dissipation device that causes a reduction in the pressure of the water so that the water can be released back into the stream or river without having a negative effect on oxygen levels in the water.

A hydroelectric power generating apparatus includes one or more inlet pipes. The inlet pipes have a length and plural apertures along the length of inlet pipes. A feedline and a turbine generator combination are interconnected with the inlet pipes. One or more outlet pipes are interconnected with the feedline and the turbine generator combination. The outlet pipes have an elevation lower than the inlet pipes. The hydroelectric power generating apparatus is configured to generate electricity from the flow of water passing through the turbine generator combination. The hydroelectric power generating apparatus also includes a pressure dissipation device configured to cause a reduction in the pressure of water so that the water can be released back into a stream or river without having a negative effect on oxygen levels in the water.

While the invention has been described with references to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

It is to be understood that the present invention is not limited to the embodiments described above, but encompasses any and all embodiments within the scope of the following claims.

I claim:

1. A hydroelectric power generating method comprising:
providing at least one inlet pipe perpendicular to a flow of water in a stream or river, the at least one inlet pipe having a length and plural apertures along the length of the at least one inlet pipe;
providing a turbine generator combination that outputs electrical power;
providing a feedline and interconnecting the feedline to the at least one inlet pipe and the turbine generator combination;
providing a pressure dissipation device that causes a reduction in the pressure of the water;
interconnecting the turbine generator combination with the pressure dissipation device;
providing at least one outlet pipe and interconnecting the at least one outlet pipe with pressure dissipation device, the at least one outlet pipe having an elevation lower than the inlet pipe;
passing a flow of water through the at least one inlet pipe, the feedline, the turbine generator combination, the pressure dissipation device and the at least one outlet pipe so that the water is released back into the stream or river without having a negative effect on oxygen levels in the water; and
generating electricity from the flow of water passing through the turbine generator combination.

2. A hydroelectric power generating apparatus comprising:
at least one inlet pipe, the at least one inlet pipe having a length and plural apertures along the length of the at least one inlet pipe;
a feedline and a turbine generator combination interconnected with said at least one inlet pipe;
a pressure dissipation device configured to cause a reduction in the pressure of water so that the water can be released back into a stream or river without having a negative effect on oxygen levels in the water; and
at least one outlet pipe interconnected with the feedline and the turbine generator combination, the at least one outlet pipe having an elevation lower than the inlet pipe;

wherein said hydroelectric power generating apparatus is configured to generate electricity from the flow of water passing through the turbine generator combination.

3. A hydroelectric power generating apparatus comprising:
   at least one inlet pipe, the at least one inlet pipe having a length and plural apertures along the length of the at least one inlet pipe;
   a feedline and a turbine generator combination interconnected with said at least one inlet pipe, the feedline having a funneling configuration of the piping, wherein the pressure of the water is increased to a pressure sufficient to turn a turbine of a turbine generator combination; and
   at least one outlet pipe interconnected with the feedline and the turbine generator combination, the at least one outlet pipe having an elevation lower than the inlet pipe;
   wherein said hydroelectric power generating apparatus is configured to generate electricity from the flow of water passing through the turbine generator combination.

4. The hydroelectric power generating apparatus according to claim 3, wherein the feedline further comprises:
   pipe couplings; and,
   an input pipe having a funnel shaped end that is interconnected to the pipe couplings.

5. The hydroelectric power generating apparatus according to claim 4, further comprising the input pipe extending for a predetermined distance and being interconnected to the turbine generator combination.

6. The hydroelectric power generating apparatus according to claim 2, wherein the inlet pipe is positioned substantially perpendicular to the direction of the flow of water.

7. The hydroelectric power generating apparatus according to claim 5, further comprising water from the input pipe passing through the turbine generator combination and through the outlet pipe.

8. The hydroelectric power generating apparatus according to claim 2, wherein the pressure dissipation device is a tank.

9. The hydroelectric power generating apparatus according to claim 8, wherein the tank comprises an attachment to a drainpipe connected to the at least one outlet pipe.

10. The hydroelectric power generating apparatus according to claim 2, wherein the at least one outlet pipe has plural apertures disposed along its length.

11. The hydroelectric power generating apparatus according to claim 2, wherein the piping is located on a bed of a river.

12. The hydroelectric power generating apparatus according to claim 2, wherein the piping is provided on the ground.

13. The hydroelectric power generating apparatus according to claim 2, wherein the piping is buried in ground near the side of a river.

14. The hydroelectric power generating apparatus according to claim 11, wherein the piping is located on a gravel foundation such that the piping is not substantially damaged in extreme flood events.

15. The hydroelectric power generating apparatus according to claim 2, wherein volume and head pressure are used to turn and drive the turbine generator combination.

16. The hydroelectric power generating apparatus according to claim 15, wherein pipe volume of the system is successively reduced downstream to obtain a predetermined turbine driving pressure.

17. The hydroelectric power generating method according to claim 1, further comprising:
   placing the inlet and turbine generator combination in and along the stream so that a head of approximately 400 feet is created; and,
   providing system piping having a diameter of approximately forty-eight inches and a run downstream of approximately two thousand feet, wherein a pressure of about one hundred seventy-five pounds per square inch is generated to drive the turbine generator combination.

* * * * *